Jan. 3, 1956  R. W. McKINLEY ET AL  2,728,938
POULTRY SCALDING MACHINE

Filed Jan. 2, 1953  3 Sheets-Sheet 1

INVENTORS.
Robert W. McKinley.
James C. Howard.
J. Howard Ernstes.
BY Wood, Herron & Evans.
ATTORNEYS.

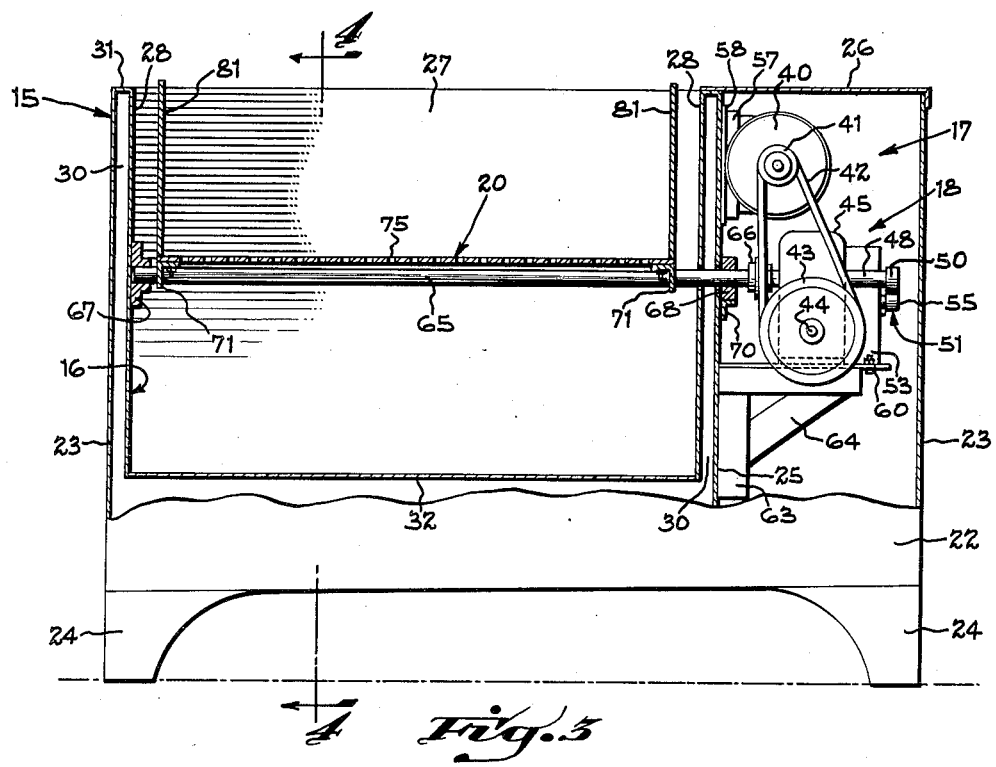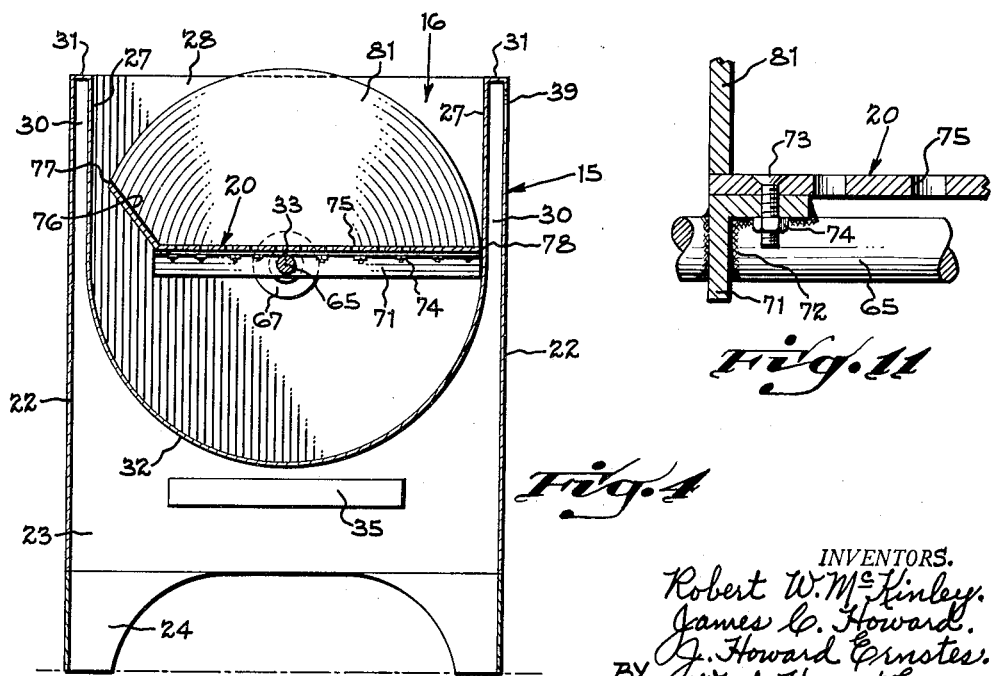

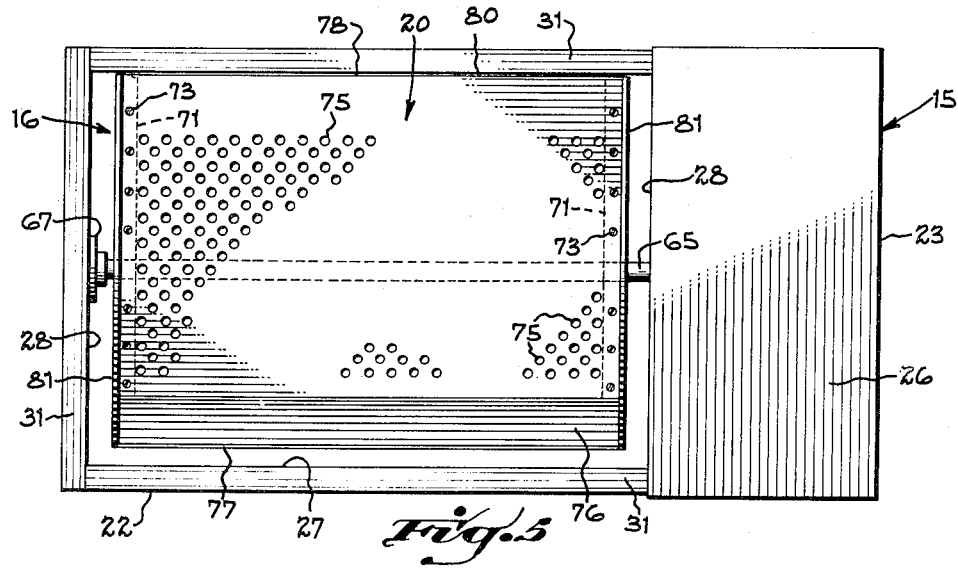
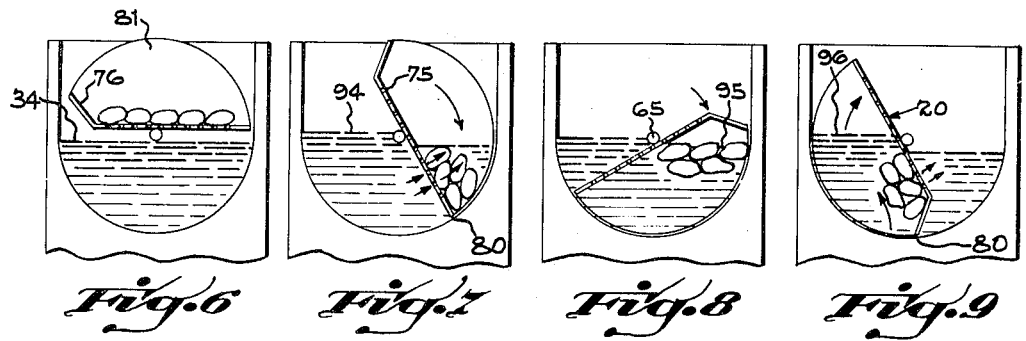
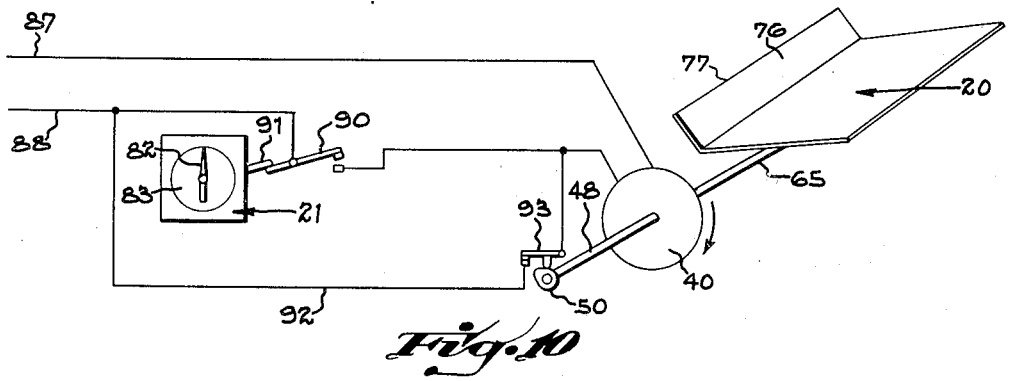

United States Patent Office 2,728,938
Patented Jan. 3, 1956

2,728,938
POULTRY SCALDING MACHINE

Robert W. McKinley, James C. Howard, and J. Howard Ernstes, Greensburg, Ind., assignors to The Ashley Machine Company, Greensburg, Ind., a corporation of Indiana Application January 2, 1953, Serial No. 329,272

11 Claims. (Cl. 17—11.2)

This invention relates to an automatic machine for scalding batches of poultry, in which the poultry is propelled successively through a scald bath for a timed period in preparation for a feather plucking operation.

The process of dressing poultry for the market, until recently, has consisted almost entirely of hand operations in which the killed birds were immersed in a vessel of scalding water for a sufficient time to loosen the feathers, then removed from the vessel and plucked individually by hand. More recently, there has been developed a power driven plucking machine which is capable of removing the feathers efficiently at a high production rate. This equipment has been widely accepted in the industry since it eliminates the tedious and expensive hand plucking operation. A machine of this character is disclosed in the patent to George R. Hunt, No. 2,300,157, which was issued on October 27, 1942.

While this machine has partially revolutionized the dressing industry, the birds still require a scalding treatment before the plucking operation; thus the hand scalding method constitutes a bottleneck in the processing operation because of its slowness. Scalding machines capable of automatic operation have been proposed in the past, but have been subject to certain disadvantages and have not proved widely acceptable for practical use in the processing plant.

In one type, the birds are confined in a perforated basket which rotates bodily about a horizontal axis with respect to a scald bath, such that the birds are moved in a circle and pass through the bath periodically. This machine is unsatisfactory chiefly because of the small capacity of the basket in relation to the size of the scalding tank, and also because its agitating action is insufficient to scald the birds uniformly over their entire surface, which should necessarily include protected areas under the wings.

In another type of machine, the birds are suspended by the legs from a rack or fixture which reciprocates the birds vertically through the scald bath. The treating capacity in relation to the tank size of this equipment, is greater than the basket type and agitation is better, but a great deal of time is necessarily consumed in hanging the birds individually upon the rack before the scald treatment and in removing them after treatment.

A principal object of the present invention has been to provide a scalding machine of exceptionally simple design and operation by utilizing a flat platform which rotates about a horizontal axis relative to a scalding tank, whereby a batch of birds may be loaded directly upon the platform to be dumped into the tank, propelled through it, and scooped from the tank successively during sustained rotation of the platform. This arrangement provides two outstanding advantages; it provides exceptionally efficient loading and unloading of the machine and it provides a far more efficient agitating and scalding action because the water is forced into contact with the skin of the birds, even in partially protected areas under the wings, to provide a uniform scald treatment and thereby facilitate the plucking operation.

A further advantage of this arrangement resides in the large batch capacity in relation to the size of the scalding tank; moreover, the flat platform when stationary, occupies a horizontal position near the open top of the tank and above the water level, such that the killed birds may be tossed at random upon it. The platform extends completely across the top of the tank so that there is no danger of the birds being tossed accidently into the scalding water beneath the platform. The platform is open and unobstructed and the machine thus provides ideal loading conditions; also, rotation of the platform is cyclic and at completion of the cycle, the platform is halted automatically in a horizontal position with the birds loaded upon it and presented to the operator in position for a convenient removal and transfer to the plucking machine.

In its simplest aspect, the improved machine consists of a scalding tank having a semicylindrical bottom, and a platform mounted for rotation upon a central longitudinal axis which is common to the axis of the bottom of the tank. In other words, in its horizontal position, the platform bisects or extends diametrically across the semicylindrical bottom; hence upon rotation, the side edges of the platform describe a circle corresponding to the cylindrical contour of the tank bottom. The platform is perforated and acts as a paddle which is effective upon rotation to dump the birds into the tank, submerge and propel them through the scald bath, and then scoop them out as the platform approaches level position. It will be understood, that upon each scalding cycle, the rotation of the platform is sustained for a predetermined period of time, which may be varied according to the type of poultry being treated, and that the platform executes a number of revolutions during the cycle.

During rotation, the perforated platform cooperates with the scalding tank to form flowing streams of scalding water, which penetrate the feathers and impinge upon the skin of the bird at the base of the feathers to loosen them. Since the birds are dumped haphazardly into the tank by the platform upon each rotation, repeated passage of the birds through the bath, exposes all parts of them to the flowing streams, thus the water is forced in directions opposite to the lay of the feathers and under the wings to provide a complete and thorough scald, which is uniform for all parts of the carcass. The flowing streams and turbulence are created by the rotating paddle which combines with the tank to raise the liquid level on the advancing side of the platform, causing the streams of scalding water to gush through the perforations and against the birds.

In scalding various types of poultry such as chickens, ducks, turkeys and the like, it will be understood that the scalding period, in terms of time, must be adjusted to suit various factors. If the scalding period is too long, the treatment is apt to partially cook the skin or discolor it and detract from the market value; on the other hand, if the period is too short, the birds will be difficult to pluck.

In the present structure, the platform is rotated by a motor and driving system and the cycle is controlled by an adjustable timer, which is interconnected electrically with the motor to provide the required scalding cycle. The control system includes a switch arranged to halt the platform at the end of the cycle upon reaching a horizontal position, so that the birds will be elevated above the scald bath and allowed to drain until removed. It has been determined in practice, that the action of the rotating paddle provides a highly efficient scalding action, and due to the turbulence, also effectively cleans the birds of dirt and loose feathers, which may adhere to them.

In order to prevent the wings and other parts of the bird from being caught between the trailing edge of the platform and tank, during platform rotation, the trailing edge is in the form of a vane which extends at an angle to the plane of the platform forwardly or outwardly in the direction of rotation. The trailing edge is located along the outer edge of the platform on the side, in relation to the axis of rotation, which propels the birds through the scald bath. By virtue of its angle in relation to the motion of the platform, the vane deflects the water and birds upwardly from the semicylindrical bottom of the tank toward the axis of rotation and thereby prevents the birds from being dragged across the bottom of the tank in contact with it, with attendant damage to the wings and other parts. In addition, the vane aids scooping the fowls out of the bath and upon the platform as the trailing edge of the vane emerges from the bath.

Various other features and advantages of the invention are more fully disclosed in the following description taken in conjunction with the drawings.

In the drawings:

Figure 3 is a longitudinal sectional view illustrating the relationship of the scalding tank, platform and driving system.

Figure 4 is a sectional view taken on line 4—4, Figure 3 further illustrating the construction and arrangement of the platform with respect to the scalding tank.

Figure 5 is a top plan view of the scalding machine.

Figure 1:
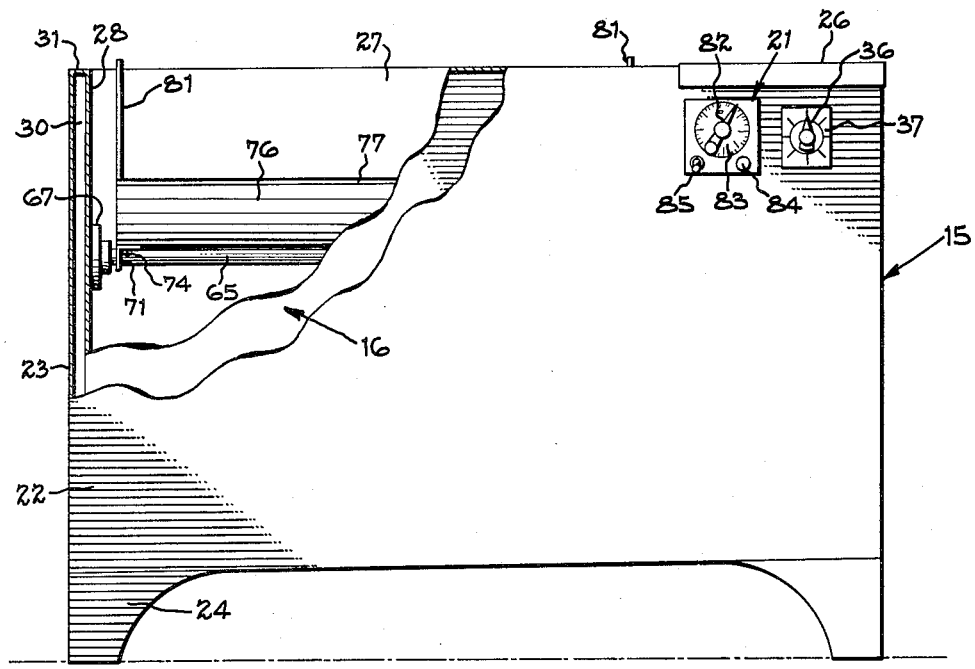
Figure 1 is a side elevation of the scalding machine illustrating the general arrangement of the housing and platform.

Figures 6 to 9 inclusive, are diagrammatic views similar to Figure 4, showing the action of the rotary platform with respect to the poultry during a scalding cycle.

Figure 10 is an electrical diagram illustrating the circuit which controls the cycles of operation.

Figure 11 is an enlarged fragmentary view taken on line 11—11, Figure 4, detailing the structure of the platform bearings.

Described in general with respect to Figures 3 to 4, the scalding machine consists of a housing indicated at 15, which includes a scalding tank indicated at 16, and a compartment 17 at one end enclosing the driving mechanism 18. The driving system is connected to the platform indicated generally at 20 which rotates about a horizontal axis within the scalding tank, as indicated in Figures 6 to 9. Each scalding operation consists of a timed cycle which is under the control of an adjustable timer, indicated at 21 in Figures 1 and 10, arranged to provide sustained rotation of the platform for a given period and to stop the platform in a level position as shown in Figure 4 at the end of the cycle. The platform rotation agitates the batch of birds in the scald bath for a predetermined time interval suitable to condition the poultry for the plucking operation. The machine is intended to scald chickens, ducks, turkeys and other fowl and the timer permits the cycle period to be adjusted in accordance with the requirements of various birds.

As explained earlier, the poultry dressing industry now utilizes power driven feather picking equipment, either automatic or manually controlled, which plucks the birds at a high production rate. The present scalding machine has a correspondingly high production rate and is intended to be used in conjunction with such plucking equipment either individually or in batteries according to the size of the plant. According to the present structure, an operator is able to load the birds directly on the platform with the platform in level position, as shown in Figure 4, and after loading, the cycle is initiated by operation of a starting switch associated with the timer. Once the cycle is initiated, the platform rotates for the thermo-controlled time period, and upon each complete rotation the birds are dumped into the scalding tank, propelled in a positive manner through the hot water, scooped upwardly and again dumped into the tank. This sequence is repeated for each rotation of the platform, and at the end of the cycle, the platform stops in level position with the scalded birds resting upon it in condition for the plucking. It will be apparent that after the platform is loaded, the operator is free to perform other duties, such as preparing another batch of birds, while the scalder operates automatically through its cycle and stops.

Described in detail, according to embodiment disclosed in the drawings, the housing 15 includes an outer shell which is made up of side walls 22—22 and end walls 23—23. The walls preferably are of sheet metal and include legs 24 which support the housing above the floor level. The compartment 17, which houses the driving mechanism, is delineated by an intermediate end wall 25 spaced inwardly from the end wall 23 as shown in Figure 3. The compartment 17 further includes a top cover plate 26, which is intended to protect the driving mechanism from feathers, water and the like.

The scalding tank 16 resides within the housing 15 and includes side walls 27—27 and end walls 28—28 which are also fabricated from sheet metal. These walls are spaced inwardly from the walls of housing 15 as indicated at 30 in Figures 3 and 4. The upper edges of the spaced tank and housing walls are joined together by a marginal top wall 31, also indicated in Figures 3 and 4, the marginal wall being adapted to support the scalding tank with reference to the housing 15.

The scalding tank is generally U-shaped in cross section providing a semicylindrical bottom 32 which is developed upon a radius centered upon the axis of the rotation of the platform, as indicated at 33 in Figure 4. The radius of the bottom, therefore, corresponds to the rotary path of motion described by the edges of the platform, there being provided a limited amount of running clearance between the edges of the platform and the internal surface of the tank. The sides and bottom of the tank are fabricated preferably from a single sheet of metal which is rolled to provide the cylindrical contour of bottom 32 and the end walls 28 are correspondingly rounded about their lower edges to conform to the radius of the tank bottom. The housing and tank walls are joined together in any well known manner, such as soldering, welding or the like, and after assembly, the structure is treated to prevent corrosion, preferably by a galvanizing dip.

A water supply inlet communicates with the scalding tank and is provided with a float valve which automatically replenishes water which is lost during operation and maintains a constant water level as indicated at 34 in Figure 6. This structure is well known and has been omitted from the drawings since it does not form a necessary part of the disclosure.

In order to maintain a constant scalding temperature, the scalding tank is provided with a heating element indicated at 35 in Figure 4, usually consisting of a gas burner. The scald bath temperature is regulated by a thermostatic control system which includes a temperature responsive element submerged in the bath (not shown) and a control system which regulates the supply of gas to the burner 35. The temperature is adjusted by means of a pointer 36 which may be rotated relative to an indicating scale 37 mounted upon the front of the housing as shown in Figure 1. The temperature regulating components are enclosed in the control box, indicated at 38 in Figure 2, and the dial is interconnected with the components so as to adjust them to the desired temperature.

The control system is interconnected with the temperature responsive element submerged in the scald bath and regulates the flow of gas to the burner, in accordance with which the control system maintains the bath accurately at the adjusted temperature, which by way of example, may be 140° F. for average conditions. The thermostatic equipment is conventional and has been omitted from the drawings since it is not essential to a disclosure of the principles of the invention. The spacing between the housing and tank, which is indicated at 30 allows the hot gases to completely envelope the scalding tank including the sides and ends, and the housing including near its upper end, a vent 39 for the escape of gas fumes.

Figure 2:
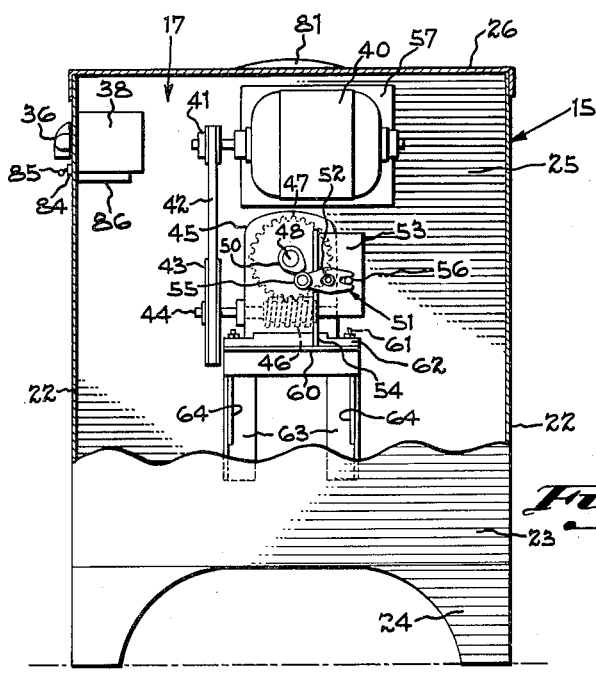
Figure 2 is an end view of the scalding machine with the end wall partially broken away to illustrate the driving system of the platform.

As best shown in Figures 2 and 3, the driving system 18 includes an electric motor 40, having a pulley 41, which is connected by a V-belt 42 to a driven pulley 43. The driven pulley is fixed upon a shaft 44 which is rotatably journalled in a gear housing 45. That portion of the shaft which projects into the gear housing includes a worm 46 which is keyed upon the shaft and which meshes with a worm wheel 47 disposed within the housing. The worm wheel is keyed upon a shaft 48 which projects from the gear housing on opposite sides. One portion of the shaft 48, projects through the end wall of the housing and scald tank and is connected to the platform 20 for rotating the platform about its longitudinal axis. The opposite end of the shaft extends outwardly and includes a cam 50.

As explained later, in connection with the control system shown in Figure 10, the cam 50 is adapted to deenergize and brake the motor 40 to a stop when the platform reaches a horizontal position as shown in Figure 4 at the end of the cycle. It will be understood at this point, that motor 40 includes a built-in electric brake which is applied when the motor is deenergized. Moreover the worm and worm wheel drive provides a non-reversible driving system, such that the platform is locked rigidly in horizontal position when motor 40 is deenergized at the end of the cycle.

Cam 50 is arranged to actuate a switch arm 51, which is pivotally mounted as at 52 upon a switch box 53. The switch box is disposed alongside of the gear housing 45 and is supported upon a bracket 54. The outer end of switch arm 51 includes a roller 55 which engages cam 50, and the opposite end of the arm is bifurcated and engages a pin 56 which extends into the switch box through a vertical slot (not shown). Pin 56 is connected to a switch mounted within the box and is effective to open the switch when the cam trips the arm to the stopping position shown in Figure 2.

As best shown in Figure 3, the base 57 of motor 40 is mounted directly upon the end wall of the compartment 17, there being provided a reenforcing plate which is indicated at 58. Adjustment means, not shown, provide vertical adjustment of the motor in order to regulate belt tension. The gear housing 45 and switch box 53 are mounted in common upon a horizontal mounting plate 60 by means of screws 61 passing through the flange 62 of the gear housing and in threaded engagement with the mounting plate. As best shown in Figure 3, plate 60 includes vertical legs 63 mounted upon the end wall of the compartment, and includes angular bracing members 64 extending from the vertical legs to the mounting plate 60. The structure is fabricated from steel angle members welded together to provide a rigid support for the gear housing.

It will be noted in Figure 5 that the drive shaft 48 is connected to the shaft 65 of the platform by a conventional coupler 66 which compensates for slight misalignment. The platform shaft 65 is rotatably mounted at one end upon the bearing 67 secured upon the end wall 28 of the tank in axial alignment with the drive shaft 48. The bearing 68 at the opposite or driving end of the platform shaft, is of the pillow type and is mounted upon an angle iron 70 secured to the end wall. As detailed in Figure 11, the opposite ends of the platform shaft include angle irons 71—71 which are welded as at 72 to the shaft 65 near its opposite ends.

As shown in Figures 5 and 11, the angle irons 71 are attached to the platform by means of flat head screws 73, which pass through the upper surface of the platform, through the angle irons and into nuts 74. According to this arrangement, the platform is installed by first mounting the platform shaft 65 and then placing the platform upon the angle irons and applying the screws 73. The welded connection between the shaft and angle irons, provides a rigid mounting and driving connection between the platform and its shaft.

The platform 20 is fabricated from heavy gauge sheet metal and is galvanized or otherwise treated to prevent corrosion. As best shown in Figure 5 the platform is provided with perforations indicated at 75, which allow for drainage of water and which provide the flow streams during rotation as described in detail later. It will be noted in Figure 4, that the platform is generally flat although its trailing edge includes a vane 76 which extends for the full length of the platform and projects at an angle outwardly from the plane of the platform in the direction of rotation. The vane preferably is integral with the platform and the perforations are omitted from it.

Vane 76 prevents the birds from being scraped across the bottom of the scalding tank and also provides a scooping action with respect to the birds as the platform approaches its horizontal position during rotation as explained later in detail. It will be understood at this point that the outer edge 77 of the vane and the opposite edge 78 of the platform proper (Figure 4), are located equidistantly on opposite sides of the axis of rotation indicated previously at 30. As explained earlier, the radius of the semicylindrical bottom of the tank is also developed about the axis 30; thus the edges of the platform and vane both describe a circle which corresponds to the contour of the tank bottom. In order to allow for slight irregularity in the curvatures of the tank, a slight amount of running clearance, which is indicated at 80 in Figures 7 and 9, is provided between the edges of the platform and vane and the surface of the tank.

It will be noted in Figure 3 that the opposite ends of the platform are provided with semicircular walls 81—81. The purpose of the end walls is to prevent protruding parts of the birds from becoming caught between the ends of the platform and the end walls of the tank. In other words, the radius of the walls corresponds to the radius of the tank bottom, with the necessary running clearance, such that the birds are confined between the end walls and between the tank bottom and platform when the platform reaches the position shown in Figure 8. In other words, during passage through the tank, the birds are completely confined within the tank, platform and the end walls of the platform and are propelled in a positive manner through the scald bath.

As explained earlier, the scalding cycle, or period of rotation of the platform, is regulated by the timer 21 which regulates operation of motor 40 and applies the brake to stop the motor when the platform is levelled at the end of the cycle. As best shown in Figure 1, the timer 21 includes an adjustable pointer 82, which is rotatable with respect to the graduations of an indicating plate 83 mounted upon the front wall of the housing 15. The rotation of the pointer from a zero position is effective to determine the length of the scalding cycle which usually ranges from 60 to 90 seconds.

As explained previously, the timer is a commercial product and its exact construction is not material to the present invention. In the preferred type, it includes a clock type electric motor arranged to open the circuit after the elapsed time setting, and a starting switch in the form of a push button indicated at 84 in Figure 1, which is effective to close the circuit and initiate the scalding cycle. Upon being set for the proper treatment period, the operator initiates each cycle by depressing the push button switch 84, and at completion of the cycle, the timer deenergizes and brakes motor 40. The timer is of the type in which the time setting is not disturbed during the operating cycles; in other words, it may be set for the desired period of scald treatment and this cycle may be repeated for successive batches of birds without further attention.

In addition to push button 84, the timer also includes a two-position selector switch 85 which provides constant operation in one position and timed operation in a second position. This switch is utilized to provide manual control of the treatment periods, if necessary, and can also be used to jog the motor if it is desirable to shift the platform from its normally level position. For example, the switch can be shifted momentarily to constant position to jog the platform to an angular position for cleaning the tank. The components of the timer are inclosed within the timer housing 86 (Figure 2), which resides within compartment 17, the pointer 82 being mounted upon a shaft which extends into the housing and includes the necessary timing mechanism.

The electrical circuit for operating motor 40 is illustrated in the diagram of Figure 10, the timer, leveling switch, cam, and platform being shown diagrammatically in the positions they assume just before the end of a scalding cycle. As shown, motor 40 is powered by the service lines 87 and 88, line 87 being connected directly to one side of the motor and line 88 having a timer switch 90 which is arranged to open the circuit when the cycle times out. The timer switch 90 is built into the timer and is located within the timer housing, but for purposes of illustration, it is shown externally and arranged to be tripped to open position by an arm 91, which is shown projecting from the timer housing.

As explained earlier, the treatment cycle is controlled essentially on the basis of elapsed time, in conjunction with the leveling cam 50, which maintains the circuit to motor 40 temporarily after the timer switch opens, in order to stop the platform in level position. For this purpose, a shunt line indicated at 92, is interconnected with line 88, bypassing timer switch 90. As explained earlier, cam 50 actuates the switch arm 51, which in turn trips the levelling switch 93 inclosed in switch box 53. For purposes of illustration, the cam 50 is shown in direct operating relationship to leveling switch 93 interposed in the shunt line 92.

In the position shown in Figure 10, the timer switch 90 has been tripped to open position at the end of the cycle and the circuit to motor 40 is completed temporarily through shunt line 92 and through the leveling switch 93, since the platform is in an inclined position. It will be apparent that upon reaching its level position, cam 50 will trip switch 93 to open position, so as to deenergize the motor and apply the electric brake. It will be understood, that during operation of the motor under timer control with switch 90 closed, the leveling switch 93 will open each time the rotating platform passes through its level position but that this will not effect the operation until the timer switch opens. Thus, during each scalding cycle, the platform rotates for a fixed period of time, then the last turn is placed under control of the cam to stop the platform in level position.

The typical action of a batch of birds during one rotation of the platform is disclosed diagrammatically in Figures 6 to 9. As best shown in Figure 6, the birds are loaded preferably in a single layer upon the platform before the cycle is initiated, the birds being supported in a position above the level of the scald bath. When the cycle is initiated by depressing the start button 84, the platform begins to rotate in the direction shown in Figure 7 and when the angle of inclination exceeds the angle of repose of the birds, they slide downwardly into the scald bath. As platform rotation continues, the birds float freely in the scald bath for a short period while the platform continues to rotate as shown in Figures 7 and 8. It will be understood that the rate of rotation is relatively slow, in the present example being in the neighborhood of twelve revolutions per minute. This provides a lineal speed which displaces the scalding water, causing the level to rise on the advancing side of the platform, as indicated at 94 in Figure 7.

The displaced scalding water provides a head pressure on the advancing side of the platform, which combined with the motion of the platform, causes the water to gush through the openings 75 to form flow streams as indicated by the arrows in Figure 7. The velocity of the flow streams naturally depends upon the diameter of the perforations combined with the velocity of the platform. It will be noted in Figure 7 that the displacement of water causes the batch of birds to follow the platform downwardly where they are exposed to the action of the flowing streams which issue through the perforation.

As the platform continues its rotary motion, the volume of water on the receding side of the platform, indicated at 95, increases as shown in Figure 8, allowing the birds to float upwardly to the surface of the scald bath. At this time the opposite or trailing edge of the platform, which includes the vane, descends upon the floating birds, reforms them into a group and begins to propel the batch across the scalding tank as shown in Figure 9.

It will be observed that the water is again displaced on the advancing side of the platform as at 96, again causing the flow streams to pass through the batch of birds. It will also be noted, that the vane, which is devoid of perforations, is effective to deflect a flowing stream of water upwardly toward the axis of rotation as indicated by the arrow. This carries the birds upwardly out of contact with the semicylindrical bottom of the tank toward the axis of rotation. As explained earlier, this action is desirable because the wings and other protruding parts of the birds are otherwise apt to become caught between the edge of the vane and surface of the tank due to the running clearance.

It will also be understood that the agitation of the scald bath dislodges dirt from the birds and the solid particles have a tendency to settle to the bottom of the tank. The deflecting action of the vane thus is effective to prevent the birds from being dragged across and in contact with solid materials which may be deposited on the bottom of the tank.

As the platform continues its advancement, the vane emerges from the surface of the bath, scooping the birds upwardly and out of the bath. After the platform rotates beyond the level position to its dumping angle, the birds are again dumped into the bath and the foregoing procedure is repeated. It will be understood that in a one minute period which represents a typical cycle, the platform will execute approximately twelve complete revolutions and that upon each dumping operation and subsequent propelling action of the platform, the birds are jumbled about in various positions. Thus, all parts of the birds are subjected to the flowing streams, both in the direction of the lay of the feathers and in the opposite direction during the successive passages through the scald tank.

It has been found in practice, that the treatment provides a thorough scalding action which is uniform for all parts of the bird, including parts which are ordinarily difficult to scald properly. It will also be recognized that the platform and tank cooperate with one another after the birds are dumped to disperse and commingle the batch of birds, and to propel them through the tank in a positive manner, as shown in Figure 8. Upon completion of the treatment, the platform is stopped by the leveling switch 93 as explained earlier, to allow the batch of birds to drain before they are transferred to the plucking machine.

Having described our invention, we claim:

1. A poultry scalding machine comprising a scalding tank, said scalding tank being provided with a partially cylindrical member forming a bottom and having side walls rising upwardly from said bottom, a substantially flat poultry propelling member mounted for rotation about a substantially horizontal axis with respect to the partially cylindrical bottom, said poultry propelling member being substantially radial to said horizontal axis, means connected to the propelling member for rotating the same, said tank being adapted to contain a liquid scald bath, said flat propelling member having a deflector extending along its side edge, said deflector being extended angularly from the plane of the propelling member and forwardly in the direction of rotation, the longitudinal axis of rotation of the propelling member being common to the axis of the cylindrical bottom of the tank, said deflector having an outer edge contiguous to the partially cylindrical bottom and sweeping across said cylindrical bottom during rotation of the propelling member, the deflector by its angularity being adapted to displace the scalding liquid upwardly on the advancing side of the propelling member during rotation through said bath to form a flowing stream acting upon the poultry within the bath and adapted to float the poultry upwardly above the cylindrical bottom, the deflector and propelling member being adapted successively to propel the poultry through the scald bath, scoop the poultry from the bath, and dump the poultry back into the bath during sustained rotation thereof.

2. A poultry scalding machine comprising a scalding tank adapted to contain a scald bath, said scalding tank being provided with a partially cylindrical member which forms a bottom, the tank having side walls rising upwardly from said bottom, a substantially flat perforated platform mounted for rotation about a substantial horizontal axis with respect to the partially cylindrical bottom, said axis of rotation being located along the longitudinal center line of said platform, the platform being substantially radial to said axis, the platform having opposite side edges spaced outwardly from said axis, the platform in stationary level position forming a closure which extends substantially across the side walls of the tank to receive and sustain the poultry above the scald bath, the horizontal axis of rotation of the platform being disposed above the level of the scald bath the cylindrical bottom being concentric to said axis, the platform having side edges moving in an arc contiguous to the cylindrical bottom, the platform upon rotation being adapted to dump the poultry into the scald bath and to sweep in an arc across said cylindrical bottom, power means for imparting sustained rotary motion to the platform, the rotating platform being adapted to displace the scald bath and raise the liquid level thereof alternately on the advancing side of the platform to form flow streams passing through the perforations of the platform and, adapted to impinge upon the surface of the poultry in the scald bath, said platform being adapted successively to propel the poultry through the scald bath, scoop the poultry from the bath and dump the poultry therein during sustained rotation of the platform.

3. A poultry scalding machine comprising a scalding tank adapted to contain a scald bath, said scalding tank being provided with a partially cylindrical member which forms a bottom, the tank having side walls rising upwardly from said bottom, a substantially flat rotatable platform mounted for rotation about a substantial horizontal axis with respect to the partially cylindrical bottom, said axis of rotation being located along the longitudinal center line of said platform, said partially cylindrical bottom being concentric to said horizontal axis and said platform being substantially radial to said axis, the platform in level stationary position extending across the side walls of the tank and supporting the poultry above the scald bath, the horizontal axis of rotation of the platform being disposed above the level of the scald bath, the platform upon rotation being adapted to dump the poultry into the scald bath and having side edges to sweep in an arc contiguous to the partially cylindrical bottom, power means for imparting sustained rotary motion to the platform for a timed period, said platform being adapted to successively propel the poultry through the scald bath, scoop the poultry from the bath and dump the poultry therein during sustained rotation of the platform, control means interconnected with the power means adapted to deenergize the same after a predetermined period of sustained platform rotation, and leveling means connected to the platform, the leveling means being interconnected with the power means and adapted to energize the power means independently of said control means until the platform rotates to a substantially level position, whereby the poultry is scooped from the bath at completion of said predetermined period and the platform stopped in substantially level position with the poultry resting upon it.

4. A poultry scalding machine comprising a scalding tank adapted to contain a scald bath, said scalding tank having a partially cylindrical member forming a bottom, the tank having side walls and end walls rising upwardly from said bottom, a substantially flat platform adapted to sustain a batch of poultry and to propel said poultry through the scald bath in the tank, said platform being substantially coextensive with the length and width of the scalding tank, bearing means supporting said platform for rotation with respect to the tank, said bearing means being mounted adjacent the end walls of the scalding tank and located upon an axis common to the partially cylindrical bottom, whereby the partially cylindrical bottom is concentric to said axis, the opposite side edges of the platform being generally radial to said axis and contiguous to said partially cylindrical bottom to sweep said bottom alternately during rotation of the platform, a pair of end walls mounted upon the opposite ends of the platform, said end walls being spaced inwardly from said bearing means, said end walls being adapted to confine the batch of poultry between the platform and bottom as the edges of the platform sweep the bottom, and means connected to the platform to rotate the same.

5. A poultry scalding machine comprising a scalding tank adapted to contain a scald bath, said scalding tank being provided with a partially cylindrical member forming a bottom and having side walls rising upwardly from the bottom along opposite sides, a platform adapted to rotate with respect to said tank, a shaft for mounting and driving said platform, bearing means for said shaft, said bearing means supporting said shaft for rotation upon an axis corresponding to the axis of the partially cylindrical bottom, whereby the partially cylindrical bottom is concentric to said axis, mounting means securing said platform to said shaft with the shaft extending substantially along the central axis of the platform, the platform being generally radial to said shaft, the opposite side edges of the platform being contiguous to said partially cylindrical bottom to sweep said bottom alternately during rotation of the platform, a driving system including a motor connected to said shaft for rotating the same, an electric control system including a timer interconnected with the motor and adapted to provide sustained rotation of said platform for a predetermined time period and thereupon to deenergize the motor, a leveling switch interconnected electrically with the control system and adapted to energize said motor after the timer deenergizes the same, and switch tripping means ing driving connection with the platform adapted to trip the leveling switch when the platform assumes a substantially level position, whereby the switch is effective to deenergize the motor and to stop the platform in a level position with respect to the tank.

6. A poultry scalding machine comprising a scalding tank adapted to contain a scald bath, said scalding tank being provided with a partially cylindrical member forming a bottom and having side walls rising upwardly from the bottom along opposite sides, a platform adapted to rotate with respect to said tank, a shaft for mounting and driving said platform, bearing means for said shaft, said bearing means supporting said shaft for rotation upon an axis corresponding to the axis of the partially cylindrical bottom, whereby the partially cylindrical bottom is concentric to said axis, mounting means securing said platform to said shaft with the shaft extending substantially along the central axis of the platform, the platform being generally radial to said shaft, the opposite side edges of the platform being contiguous to said bottom thereby to sweep said bottom alternately during rotation of the platform, a driving system including a motor connected to said shaft for rotating the same, an electric control system including a timer interconnected with the motor and adapted to provide sustained rotation of said platform for a predetermined time period and thereupon to deenergize the motor, a cam mounted upon said shaft, and a leveling switch mounted relative to said cam and adapted to be tripped upon each rotation of the platform across a level position, said switch being interconnected electrically with the control system and adapted to energize said motor after the timer deenergizes the same, whereby the leveling switch is effective to deenergize the motor and to stop the platform in a level position with respect to the tank.

7. A poultry scalding machine comprising a scalding tank adapted to contain a liquid scald bath, said scalding tank having an internal, semi-cylindrical bottom surface and having side walls, a rotary platform mounted upon a substantially horizontal axis of rotation above the level of the scald bath, said side walls rising vertically in parallelism with one another to a plane substantially higher than the plane of the platform, said platform being substantially radial to said axis of rotation and said semi-cylindrical bottom surface being concentric to said axis of rotation, and means connected to the platform for rotating the same, the platform having at least one side edge spaced outwardly from said horizontal axis of rotation and contiguous to the said semi-cylindrical bottom surface, said edge advancing across said surface during rotation of the platform, the platform thereby commingling and propelling the poultry through the scald bath, scooping the poultry from the bath and successively dumping the same back into the bath during the sustained rotation thereof.

8. A poultry scalding machine comprising a scalding tank adapted to contain a liquid scald bath, said scalding tank having an internal, semi-cylindrical bottom surface and having side walls, a platform mounted upon a substantially horizontal axis of rotation above the level of the scald bath, said side walls rising vertically in parallelism with one another to a plane substantially higher than the plane of the platform, said platform being substantially radial to said axis of rotation and said semi-cylindrical bottom surface being concentric to said axis of rotation, motor means connected to the platform for rotating the same about said axis, the platform having opposite side edges spaced outwardly from said horizontal axis of rotation and contiguous to the said semi-cylindrical bottom surface, said edges alternately advancing across said surface during rotation of the platform, the platform thereby commingling and advancing the poultry through the scald bath, scooping the poultry from the bath and successively dumping the same back into the bath during the sustained rotation thereof, and timer means interconnected with said motor means to deenergize the same after a predetermined time period of sustained rotation of the platform.

9. A poultry scalding machine comprising a scalding tank adapted to contain a liquid scald bath, said scalding tank having an internal, semi-cylindrical bottom surface and having side walls, a platform mounted upon a substantially horizontal axis of rotation above the level of the scald bath, said side walls rising vertically in parallelism with one another to a plane substantially higher than the plane of the platform, said platform being substantially radial to said axis of rotation, said semi-cylindrical bottom surface being concentric to said axis, an electric motor connected to the platform for rotating the same about said axis, the platform having opposite side edges spaced outwardly from said horizontal axis of rotation and contiguous to the said semi-cylindrical bottom surface, said edges alternately advancing across said surface during rotation of the platform, the platform thereby commingling and propelling the poultry through the scald bath, scooping the poultry from the bath and successively dumping the same back into the bath during the sustained rotation thereof, a timer electrically connected with said motor to deenergize the same after a predetermined period of sustained rotation of the platform, and electric switch means connected with the platform and interconnected with the electrical connection of the timer and motor to energize said motor independently of said timer until the platform rotates to a substantially level position, whereby the poultry is scooped from the scald bath at completion of said predetermined period with the platform stopped in substantially level position with the poultry resting upon it.

10. A poultry scalding machine comprising a scalding tank adapted to contain a liquid scald bath, said tank having an internal, partially cylindrical bottom, a platform mounted upon a substantially horizontal axis of rotation above the level of the scald bath, a pair of side walls rising vertically in parallelism with one another from said partially cylindrical bottom to a plane substantially higher than the plane of the platform and providing an open top for loading the poultry upon the platform, said platform being substantially radial to said horizontal axis of rotation, the partially cylindrical bottom being concentric to said axis, the platform having opposite side edges spaced outwardly from said horizontal axis of rotation and contiguous to said partially cylindrical bottom, said side edges advancing alternately across said partially cylindrical bottom during rotation of the platform, the platform having a plurality of openings formed therein, and means connected to the platform for imparting sustained rotary motion thereto, the rotating platform displacing the scald bath and raising the liquid level thereof on the advancing side thereof and creating flowing streams passing through said openings, the platform successively commingling and propelling the poultry through the scald bath, scooping the poultry from the bath and dumping the poultry therein during sustained rotation, said flowing streams impinging upon the surfaces of the poultry and agitating the same in the bath, thereby to provide a uniform scald treatment extending over all parts of the poultry.

11. A poultry scalding machine comprising a scalding tank adapted to contain a liquid scald bath, said tank having an internal, partially cylindrical bottom for guiding the poultry, a platform mounted upon a substantially horizontal axis of rotation above the level of the scald bath, a pair of side walls rising vertically in parallelism with one another to a plane substantially higher than the plane of the platform and providing an open top for loading the poultry upon the platform, said platform being substantially radial to said horizontal axis of rotation, the partially cylindrical bottom being concentric to said axis, the platform having opposite side edges spaced outwardly from said horizontal axis of rotation and contiguous to said semi-cylindrical bottom, said edges advancing alternately across said partially cylindrical bottom, during rotation of the platform, the platform having a plurality of openings formed therein, motor means connected to the platform for imparting sustained rotary motion thereto, the rotating platform displacing the scald bath and raising the liquid level thereof on the advancing side of the platform and forming flowing streams passing through said openings to agitate the poultry in the bath, the platform successively commingling and propelling the poultry through the scald bath, scooping the poultry from the bath and dumping the poultry therein during sustained rotation thereby to provide a uniform scald treatment extending over all parts of the poultry, and means connected to the platform for deenergizing said motor means at the end of a treatment period when said propelling member rotates to a substantially level position, whereby the poultry which is scooped from the scald bath is sustained upon said propelling member above the scald bath for drainage through said perforations.

References Cited in the file of this patent

UNITED STATES PATENTS

| | | |
|---|---|---|
| 482,283 | Thomas | Sept. 6, 1892 |
| 1,130,127 | Yandle | Mar. 2, 1915 |
| 1,183,493 | Randolph | May 16, 1916 |
| 1,672,555 | Barker et al. | June 5, 1928 |
| 1,730,964 | Barker et al. | Oct. 8, 1929 |
| 1,748,872 | Farley | Feb. 25, 1930 |
| 2,015,058 | Bruce | Sept. 24, 1935 |
| 2,571,032 | Hanson | Oct. 9, 1951 |
| 2,637,066 | Johnson | May 5, 1953 |